United States Patent
Yang et al.

(10) Patent No.: US 11,589,348 B2
(45) Date of Patent: Feb. 21, 2023

(54) RECEPTION OF OVERLAPPING PHYSICAL DOWNLINK SHARED CHANNEL COMMUNICATIONS

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Wanshi Chen, San Diego, CA (US); Peter Gaal, San Diego, CA (US); Aamod Khandekar, San Diego, CA (US); James Beckman, La Jolla, CA (US); Enoch Shiao-Kuang Lu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 118 days.

(21) Appl. No.: 16/946,979

(22) Filed: Jul. 14, 2020

(65) Prior Publication Data

US 2021/0068133 A1   Mar. 4, 2021

Related U.S. Application Data

(60) Provisional application No. 62/892,456, filed on Aug. 27, 2019.

(51) Int. Cl.
*H04W 72/04* (2009.01)
*H04W 72/0446* (2023.01)
*H04W 72/12* (2009.01)
*H04L 5/00* (2006.01)
*H04W 72/1273* (2023.01)

(52) U.S. Cl.
CPC ..... *H04W 72/0446* (2013.01); *H04W 72/042* (2013.01); *H04L 5/0042* (2013.01); *H04W 72/1273* (2013.01); *H04W 72/1289* (2013.01)

(58) Field of Classification Search
CPC ......... H04W 72/1273; H04W 72/1289; H04W 72/042; H04W 72/0446; H04L 1/0013; H04L 5/0042; H04L 5/0044; H04L 5/0007
See application file for complete search history.

(56) References Cited

U.S. PATENT DOCUMENTS

2017/0285130 A1* 10/2017 Kim ................ H04L 1/1812
2017/0367046 A1* 12/2017 Papasakellariou ......................... H04W 72/0453
2018/0287745 A1* 10/2018 Sun ................ H04L 1/1864
(Continued)

OTHER PUBLICATIONS

International Search Report and Written Opinion—PCT/US2020/070277—ISA/EPO—Oct. 27, 2020.

*Primary Examiner* — Kevin C. Harper
(74) *Attorney, Agent, or Firm* — Harrity & Harrity, LLP

(57) ABSTRACT

Various aspects of the present disclosure generally relate to wireless communication. In some aspects, a mobile station may receive an indication of whether a first physical downlink shared channel (PDSCH) communication is to be punctured in a set of resources in which a second PDSCH communication at least partially overlaps with the first PDSCH communication, or both the first PDSCH communication and the second PDSCH communication are to be transmitted in the set of resources. The mobile station may decode the first PDSCH communication based at least in part on the indication. Numerous other aspects are provided.

30 Claims, 10 Drawing Sheets

(56) References Cited

U.S. PATENT DOCUMENTS

2018/0288745 A1* 10/2018 Davydov ............. H04W 76/27
2019/0254009 A1*  8/2019 Hwang ............. H04W 72/1205
2020/0021999 A1*  1/2020 Park ..................... H04L 1/1854

* cited by examiner

RECEPTION OF OVERLAPPING PHYSICAL DOWNLINK SHARED CHANNEL COMMUNICATIONS

CROSS-REFERENCE TO RELATED APPLICATION

This patent application claims priority to U.S. Provisional Patent Application No. 62/892,456, filed on Aug. 27, 2019, entitled "RECEPTION OF OVERLAPPING PHYSICAL DOWNLINK SHARED CHANNEL COMMUNICATIONS," and assigned to the assignee hereof. The disclosure of the prior application is considered part of and is incorporated by reference into this patent application.

TECHNICAL FIELD

Aspects of the technology described below generally relate to wireless communication and to techniques and apparatuses for reception of overlapping physical downlink shared channel communications. Some techniques and apparatuses described herein enable and provide wireless communication devices and systems configured for low latency scenarios and enhanced reliability.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a New Radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented later.

As indicated above, a user equipment (UE) may support various types of services in a wireless network, such as an enhanced mobile broadband (eMBB) service, an ultra reliable low latency communication (URLLC) service, and/or the like. To support multiple services in the wireless network, the UE may be scheduled to receive overlapping physical downlink shared channel (PDSCH) communications (e.g., that at least partially overlap in the time domain and/or frequency domain) in the same frequency carrier or component carrier. In this case, the UE may be unable to determine whether both PDSCH communications are transmitted in overlapped time-domain and/or frequency domain resources or whether one of the PDSCH communications is punctured, such that another PDSCH communication is transmitted in the overlapped time-domain and/or frequency domain resources, which may cause decoding errors for the first PDSCH communication. Some aspects described herein provide techniques and apparatuses for reception of overlapping PDSCH communications. In some aspects, a UE may receive an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources. In this way, the UE may decode the first PDSCH communication based at least in part on the indication, which may decrease decoding errors for the first PDSCH communication, may decrease latency in receiving and/or decoding the second PDSCH communication, and/or the like.

In some aspects, a method of wireless communication, performed by a mobile station, may include receiving an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources; and decoding the first PDSCH communication based at least in part on the indication.

In some aspects, a method of wireless communication, performed by a base station (BS), may include transmitting an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources; and transmitting the first PDSCH communication and the second PDSCH communication based at least in part on the indication.

In some aspects, a mobile station for wireless communication may include memory and one or more processors operatively coupled to the memory. The memory and the one or more processors may be configured to receive an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources; and decode the first PDSCH communication based at least in part on the indication.

In some aspects, a BS for wireless communication may include memory and one or more processors operatively coupled to the memory. The memory and the one or more processors may be configured to transmit an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources; and transmit the first PDSCH communication and the second PDSCH communication based at least in part on the indication.

In some aspects, a non-transitory computer-readable medium may store one or more instructions for wireless communication. The one or more instructions, when executed by one or more processors of a mobile station, may cause the one or more processors to receive an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources; and decode the first PDSCH communication based at least in part on the indication.

In some aspects, a non-transitory computer-readable medium may store one or more instructions for wireless communication. The one or more instructions, when executed by one or more processors of a BS, may cause the one or more processors to: transmit an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources; and transmit the first PDSCH communication and the second PDSCH communication based at least in part on the indication.

In some aspects, an apparatus for wireless communication may include means for receiving an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources; and means for decoding the first PDSCH communication based at least in part on the indication.

In some aspects, an apparatus for wireless communication may include means for transmitting an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources; and means for transmitting the first PDSCH communication and the second PDSCH communication based at least in part on the indication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
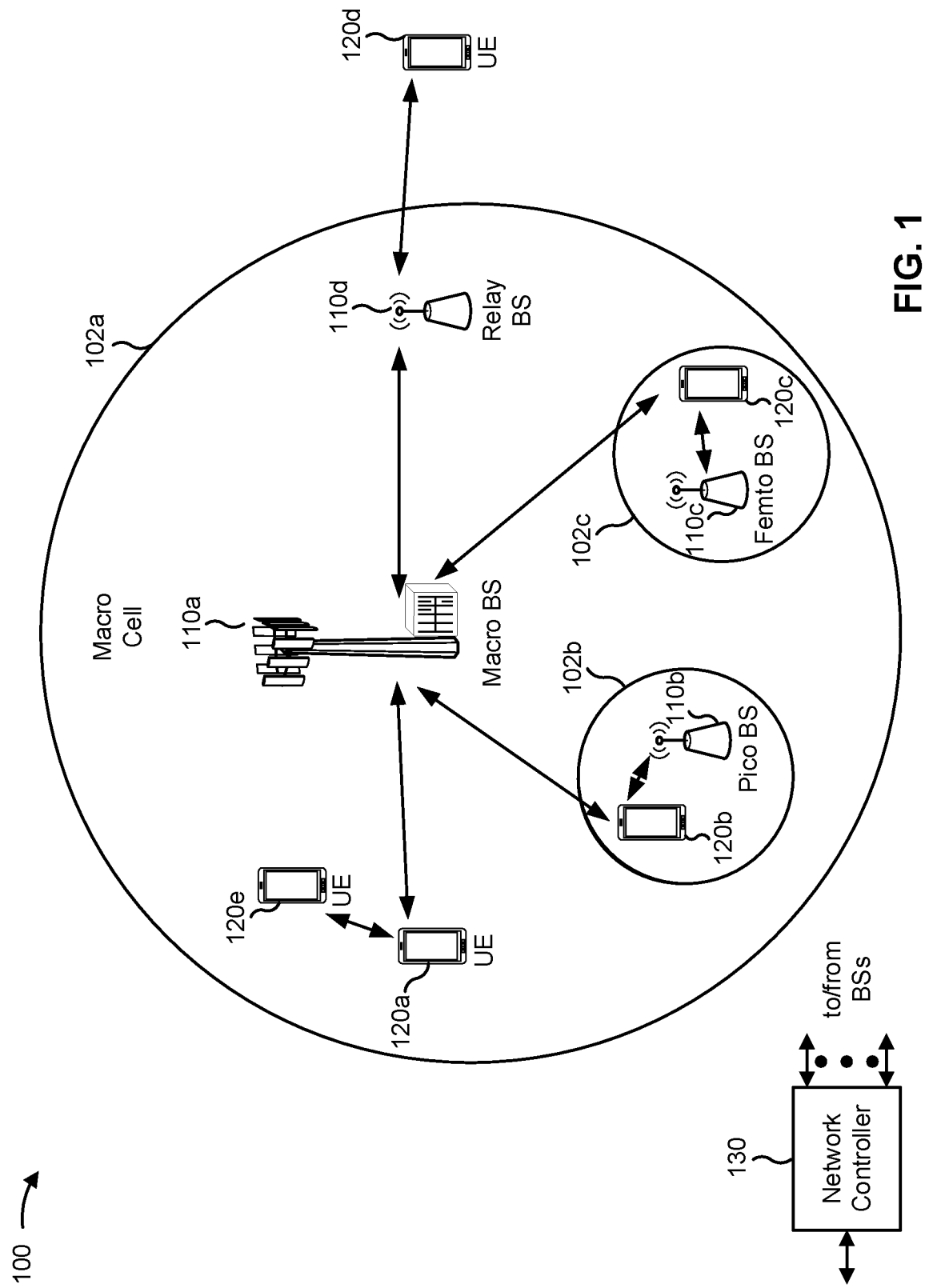
FIG. 1 is a block diagram conceptually illustrating an example of a wireless communication network, in accordance with various aspects of the present disclosure.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided merely as an example. Other examples may differ from what is described with regard to FIG. 1.

Figure 2:
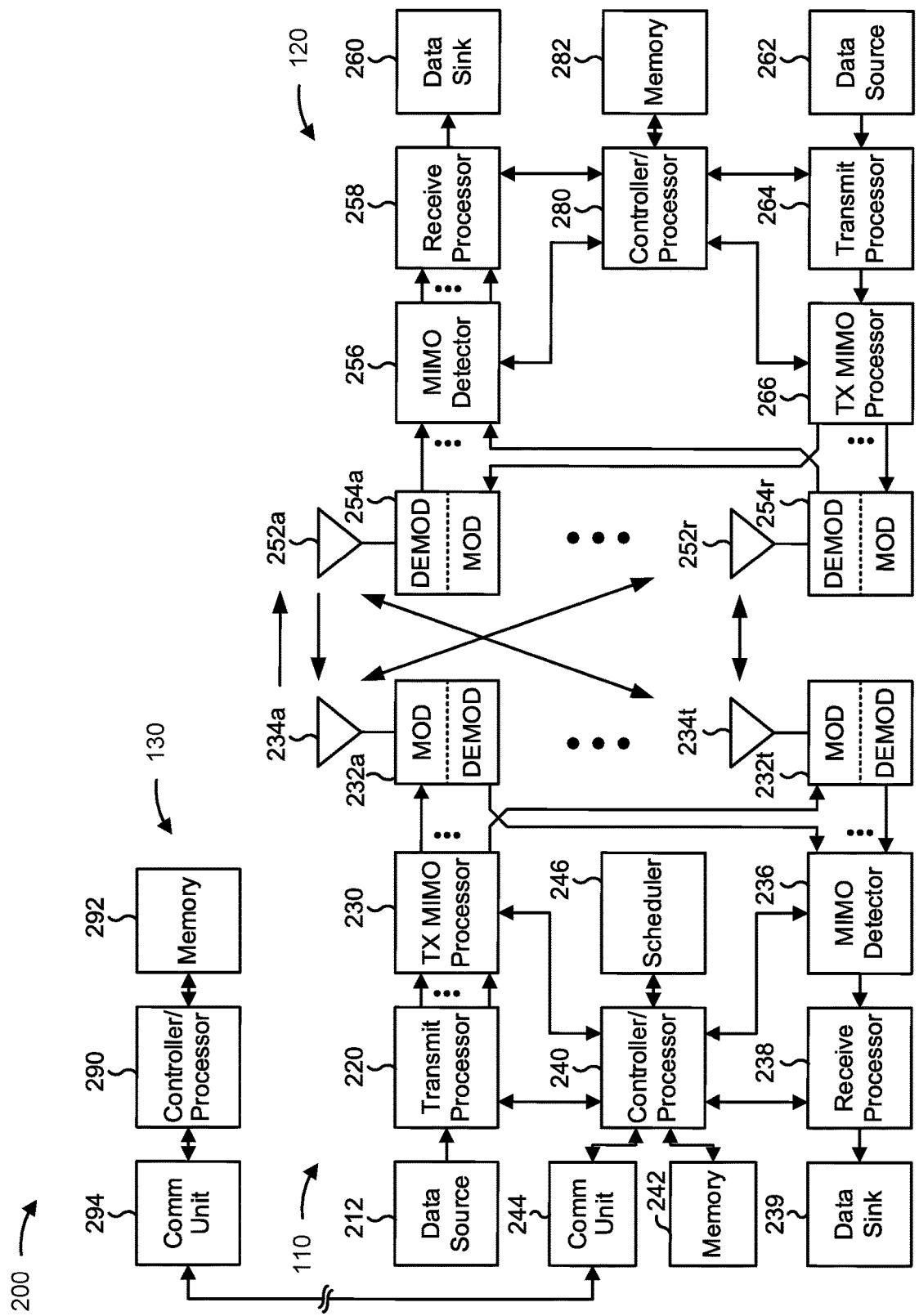
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink RF signals. The downlink RF signals may be received from and/or may be transmitted by one or more base stations 110. The signals can be provided to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reception of overlapping physical downlink shared channel (PDSCH) communications, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of means or components for implementing communication functions. For example, the variety of means may include means for receiving an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources, means for decoding the first PDSCH communication based at least in part on the indication, and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, the base station 110 may include a variety of means or components for implementing communication functions. For example, the variety of means may include means for transmitting an indication of whether a first PDSCH communication is to be punctured in a set of resources in which a second PDSCH communication at least partially overlaps with the first PDSCH communication or both the first PDSCH communication and the second PDSCH communication are to be transmitted in the set of resources, means for transmitting the first PDSCH communication and the second PDSCH communication based at least in part on the indication, and/or the like.

In some aspects, the base station 110 may include a variety of structural components for carrying out functions of the various means. For example, structural components that carry out functions of such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3A:
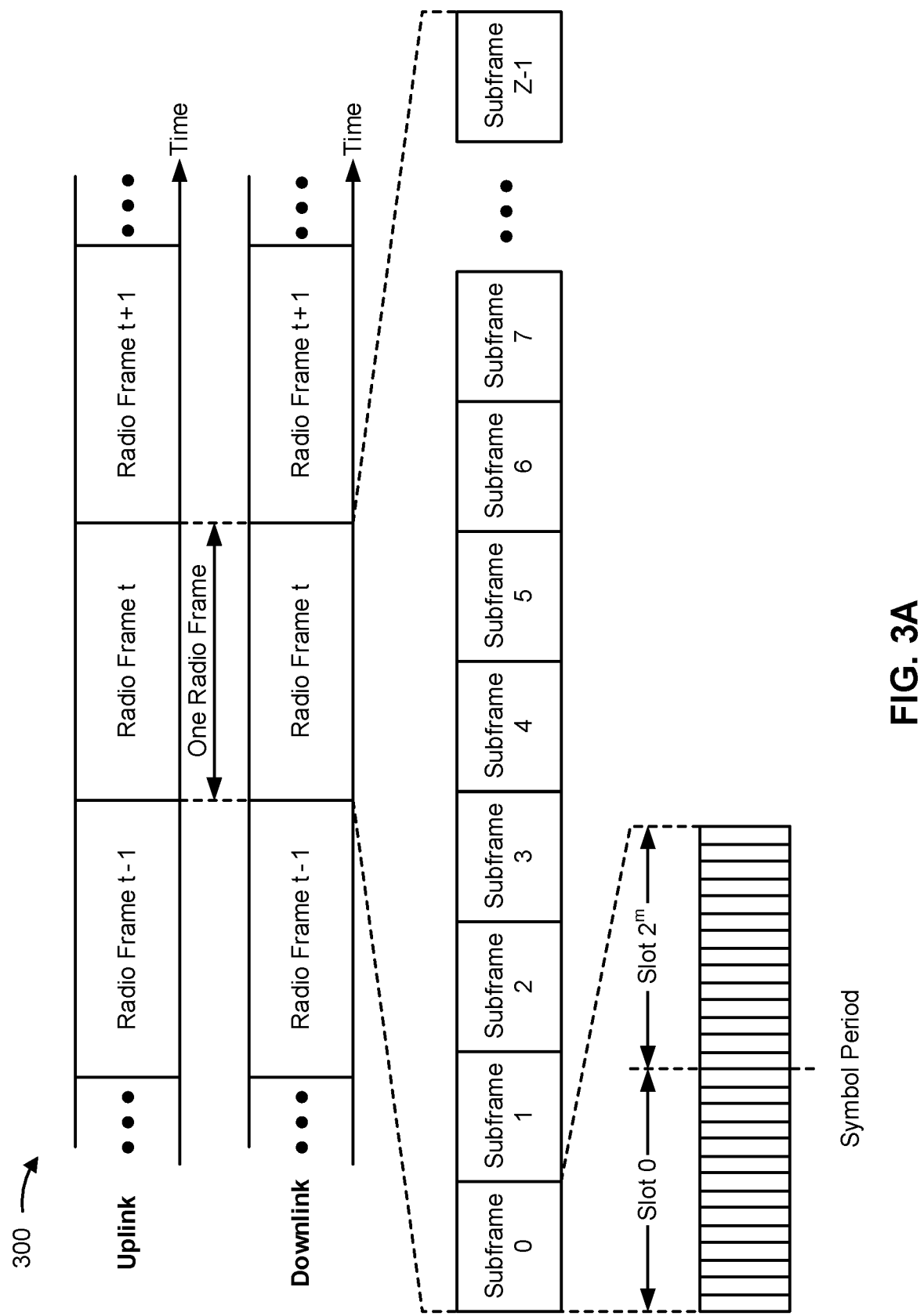
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
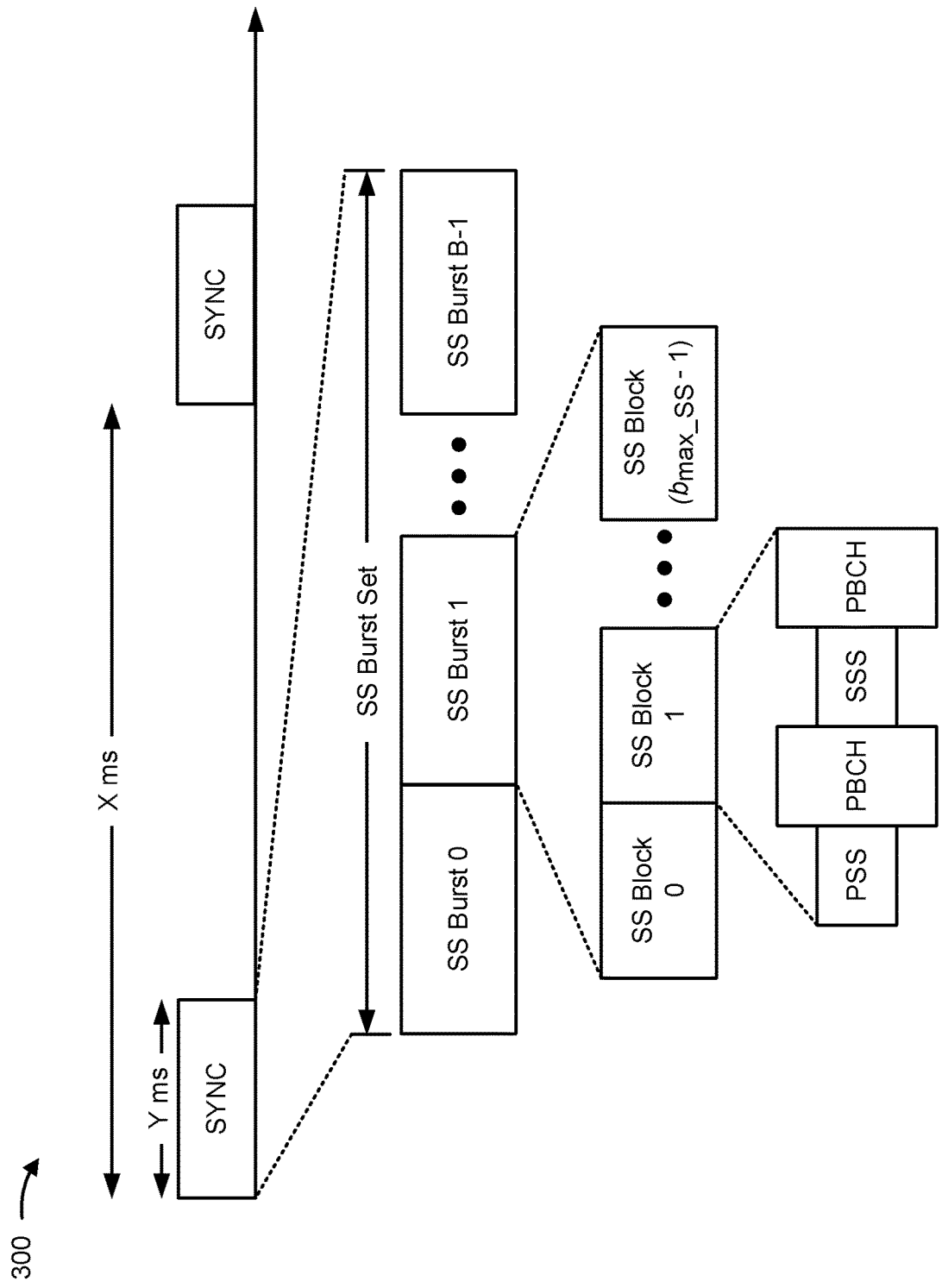
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
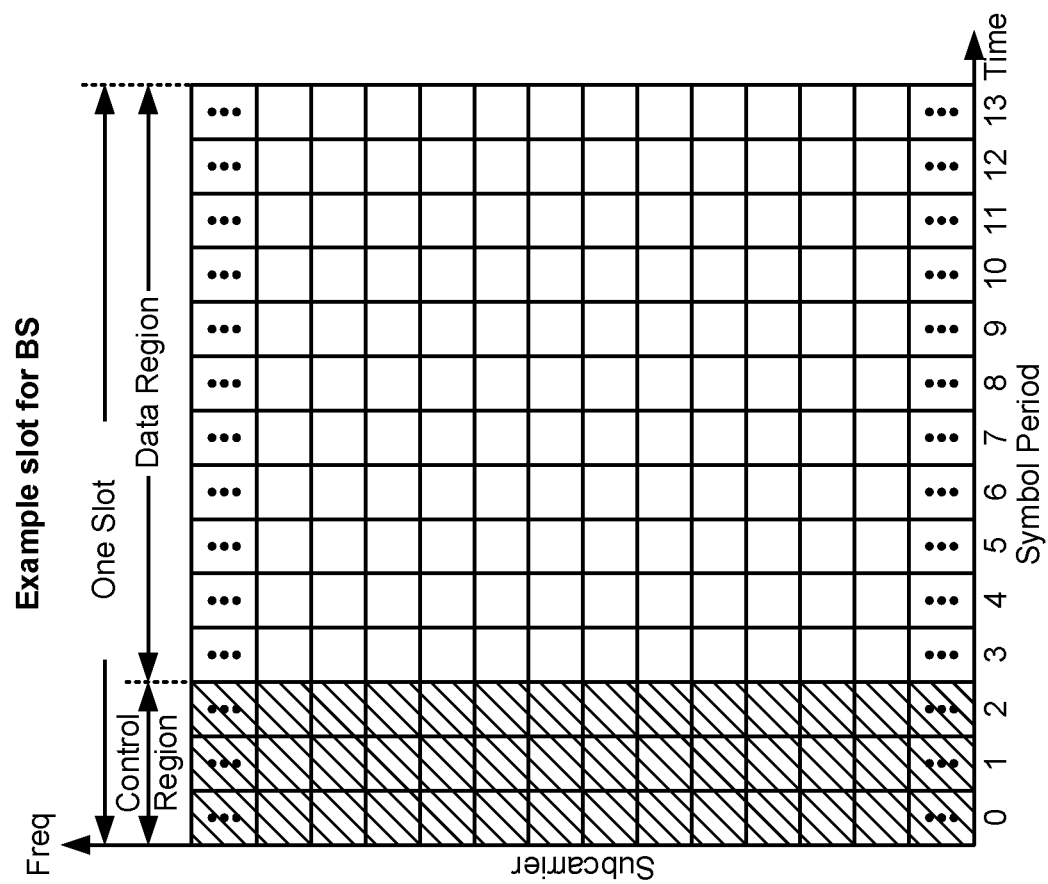
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

As indicated above, a UE may support various types of services in a wireless network, such as an eMBB service, a URLLC service, and/or the like. To support multiple services in the wireless network, the UE may be scheduled to receive overlapping PDSCH communications (e.g., that at least partially overlap in the time domain and/or frequency domain) in the same frequency carrier or component carrier. For example, the UE may be configured, by a dynamic downlink grant, with a set of time-domain and/or frequency domain resources for receiving a first PDSCH communication associated with the eMBB service, and may be scheduled, by a second dynamic grant, such that a second PDSCH communication associated with the URLLC service at least partially overlaps with the first PDSCH communication on a set of resources. In this case, the UE may be unable to determine whether both PDSCH communications are transmitted in the overlapped time-domain and/or frequency domain resources, or whether the first PDSCH is punctured such that only the second PDSCH communication is transmitted in the overlapped time-domain and/or frequency domain resources, which may cause decoding errors for the first PDSCH communication.

Some aspects described herein provide techniques and apparatuses for reception of overlapping PDSCH communications. In some aspects, a UE may receive an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources. In this way, the UE may decode the first PDSCH communication based at least in part on the indication, which may decrease decoding errors for the first PDSCH communication, may decrease latency in receiving and/or decoding the second PDSCH communication, and/or the like.

Figure 5:
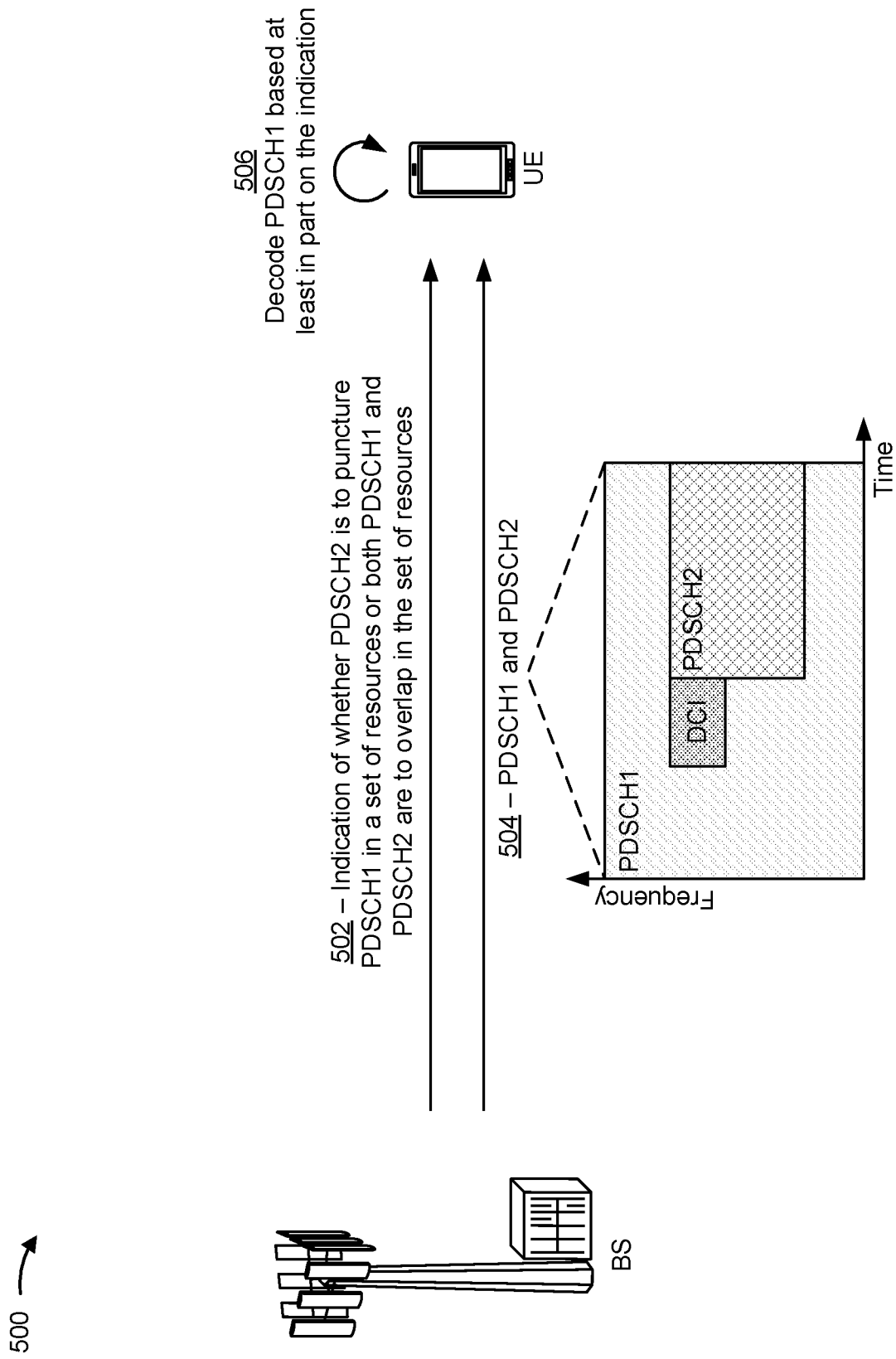
FIGS. 5-7 are diagrams illustrating examples of reception of overlapping physical downlink shared channel communications, in accordance with various aspects of the present disclosure.

FIG. 5 is a diagram illustrating one or more examples 500 of reception of overlapping PDSCH communications, in accordance with various aspects of the present disclosure. As shown in FIG. 5, example(s) 500 may include communications between a BS (e.g., BS 110) and a UE (e.g., UE 120). In some aspects, the BS and the UE may be included in a wireless network (e.g. wireless network 100).

In some aspects, the BS and the UE may support various types of services in the wireless network, such as an eMBB service, a URLLC service, and/or the like. In some aspects, the BS may transmit PDSCH communications to the UE in supporting the various services in the wireless network. The BS may schedule the transmission of a PDSCH communication to the UE by transmitting a downlink scheduling grant to the UE. The downlink scheduling grant may include a semi-static downlink grant transmitted via a radio resource control (RRC) communication, a dynamic grant transmitted via a downlink control information (DCI) communication, and/or the like.

In some cases, the BS may schedule transmission of two or more PDSCH communications to the UE such that the two or more PDSCH communications at least partially overlap in one or more resources (e.g., time-domain resources, frequency-domain resources, and/or the like). For example, the BS may schedule a transmission of a PDSCH communication (e.g., PDSCH2) associated with a URLLC service to at least partially overlap with a transmission of a PDSCH communication (e.g., PDSCH1) associated with an eMBB service so that a latency parameter associated with the URLLC service is satisfied. In this case, the BS may determine whether to puncture PDSCH1 such that only PDSCH2 is transmitted in a set of resources (e.g., one or more resource elements) in which PDSCH1 and PDSCH2 overlap, or to transmit both PDSCH1 and PDSCH2 in the set of resources in which PDSCH1 and PDSCH2 overlap.

In some aspects, the BS may determine whether to puncture PDSCH1 based at least in part on a capability of the UE to support simultaneous reception of a plurality of PDSCH communications in the same resources (e.g., a capability to decode the plurality of PDSCH communications). For example, the UE may transmit, to the BS, a communication (e.g., an uplink control information (UCI) communication, a MAC-CE communication, an RRC communication, and/or the like) that identifies a capability of the UE to support simultaneous reception of a plurality of PDSCH communications in the same resources and/or a capability of the UE to support reception of a punctured PDSCH communication, and the BS may determine to puncture PDSCH1 or to transmit both PDSCH1 and PDSCH2 in the set of resources in which PDSCH1 and PDSCH2 overlap based at least in part on the communication.

As shown in FIG. 5, and by reference number 502, the BS may transmit, to the UE, an indication of whether PDSCH2 is to puncture PDSCH1 in the set of resources in which PDSCH1 and PDSCH2 overlap or the BS is to transmit both PDSCH1 and PDSCH2 in the set of resources. In some aspects, the indication may be included in one or more downlink communications, such as an RRC communication, a MAC-CE communication, a DCI communication, and/or the like. In some aspects, the indication may be semi-statically configured for the UE. For example, the BS may include the indication in a semi-static downlink grant scheduled for the UE. As another example, the indication may be dynamically indicated to the UE. For example, the BS may include the indication in a dynamic downlink grant associated with PDSCH2 (e.g., in one or more bits in a field included in a DCI communication associated with PDSCH2).

As further shown in FIG. 5, and by reference number 504, the BS may transmit PDSCH1 and PDSCH2 to the UE. In some aspects, the BS may transmit PDSCH1 and PDSCH2 based at least in part on determining whether PDSCH2 is to puncture PDSCH1 in the set of resources in which PDSCH1 and PDSCH2 overlap or both PDSCH1 and PDSCH2 are to be transmitted in the set of resources.

For example, if the BS determines that PDSCH2 is to puncture PDSCH1, the BS may remove the signal of PDSCH1 mapped to the set of resources, may transmit PDSCH1 based at least in part on removing the signal of PDSCH1 mapped to the set of the resources, and may transmit only PDSCH2 in the set of resources. As another example, if the BS determines to transmit both PDSCH1 and PDSCH2 in the set of resources, the BS may transmit PDSCH1 and PDSCH2 in the set of resources such that PDSCH1 and PDSCH2 are transmitted on overlapping time-domain and/or frequency-domain resources. In this case, the BS may transmit super-positioned signals of PDSCH1 and PDSCH2 in the set of resources.

In some aspects, the BS may further transmit, to the UE, a DCI communication that includes a dynamic scheduling grant associated with PDSCH2. In some aspects, the BS may transmit the DCI communication in a set of resources in which the DCI communication and PDSCH1 at least partially overlap. In this case, the BS may puncture PDSCH1 such that only the DCI communication is transmitted in the set of resources in which the DCI communication and PDSCH1 at least partially overlap.

As further shown in FIG. 5, and by reference number 506, the UE may receive PDSCH1, PDSCH2, and the DCI communication associated with PDSCH2, and may decode PDSCH1 based at least in part on the indication of whether PDSCH2 is to puncture PDSCH1 in the set of resources in which PDSCH1 and PDSCH2 overlap or the BS is to transmit both PDSCH1 and PDSCH2 in the set of resources. For example, the UE may decode PDSCH1 based at least in part on demodulating, de-rate matching, and/or performing other channel decoding processes for PDSCH1 based at least in part on whether only PDSCH2 was transmitted in the set of resources or both PDSCH1 and PDSCH2 were transmitted in the set of resources. Moreover, the UE may decode PDSCH1 based at least in part on demodulating, de-rate matching, and/or performing other channel decoding processes for PDSCH1 based at least in part on the DCI communication puncturing PDSCH1 in the set of resources in which the DCI communication and PDSCH1 at least partially overlap.

In this way, the UE may receive an indication of whether PDSCH1 is to be punctured in a set of resources in which PDSCH2 at least partially overlaps with the PDSCH1 or both the PDSCH1 and PDSCH2 are to be transmitted in the set of resources. In this way, the UE may decode PDSCH1 based at least in part on the indication, which may decrease decoding errors for PDSCH1, may decrease latency in receiving and/or decoding PDSCH2, and/or the like.

As indicated above, FIG. 5 is provided as one or more examples. Other examples may differ from what is described with respect to FIG. 5.

Figure 6:
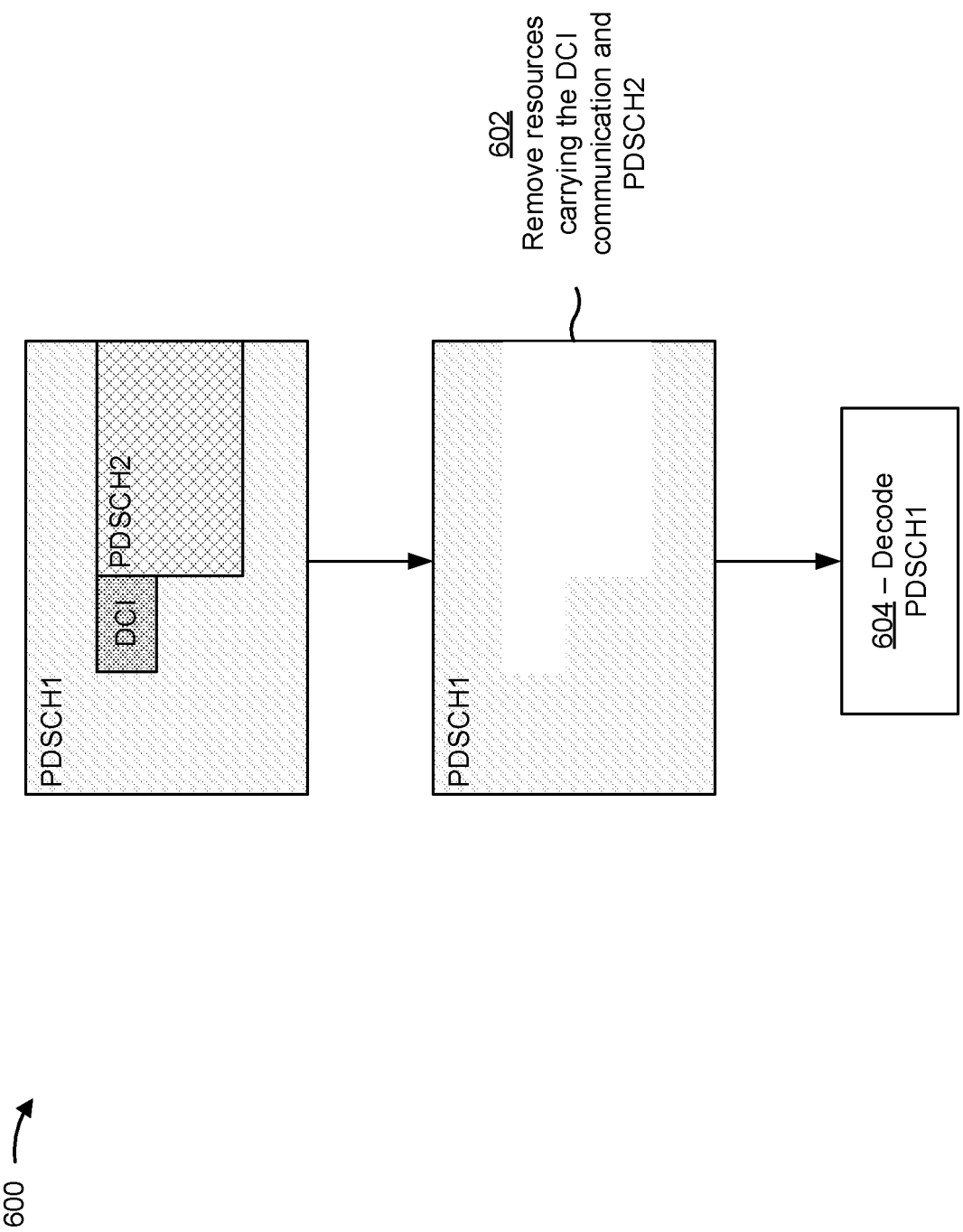

FIG. 6 is a diagram illustrating one or more examples 600 of reception of overlapping PDSCH communications, in accordance with various aspects of the present disclosure. In some aspects, example(s) 600 may include decoding, by a UE (e.g., UE 120), a PDSCH communication (e.g., PDSCH1) that at least partially overlaps with another PDSCH communication (e.g., PDSCH2), and that is punctured by the other PDSCH communication and the DCI communication associated with the other PDSCH communication.

As shown in FIG. 6, and by reference number 602, the UE may decode PDSCH1 by removing the resources (e.g., resource elements and/or other time-domain and/or frequency-domain resources) carrying PDSCH2 and the DCI communication associated with PDSCH2. In some aspects, the UE may remove the resources carrying PDSCH2 and the DCI communication based at least in part on receiving an indication from a BS to remove the resources carrying PDSCH2 and the DCI communication when decoding PDSCH1. In this case, the BS may transmit the indication to the UE based at least in part on receiving a communication (e.g., a UCI communication, a MAC-CE communication, an RRC communication, and/or the like) that identifies a capability of the UE to decode punctured PDSCH communications by removing the punctured resources carrying other communications.

In some aspects, the UE may identify the resources carrying PDSCH2 based at least in part on a dynamic downlink grant included in the DCI communication. In this case, the dynamic downlink grant may identify the resources that are to carry PDSCH2.

In some aspects, the UE may remove the resources carrying PDSCH2 and the DCI communication by setting the log likelihood ratios (LLRs) associated with the resources to zero values when de-rate matching PDSCH1. This may increase the accuracy of decoding PDSCH1, relative to using LLRs for the resources that are determined based at least in part on the resources carrying PDSCH2 and the DCI communication (e.g., relative to not setting the LLRs to zero values).

As further shown in FIG. 6, and by reference number 604, the UE may decode PDSCH1 based at least in part on removing the resources carrying PDSCH2 and the DCI communication. For example, the UE may decode PDSCH1 based at least in part on the LLRs associated with the resources being set to zero values during the de-rate matching process.

As indicated above, FIG. 6 is provided as one or more examples. Other examples may differ from what is described with respect to FIG. 6.

Figure 7:
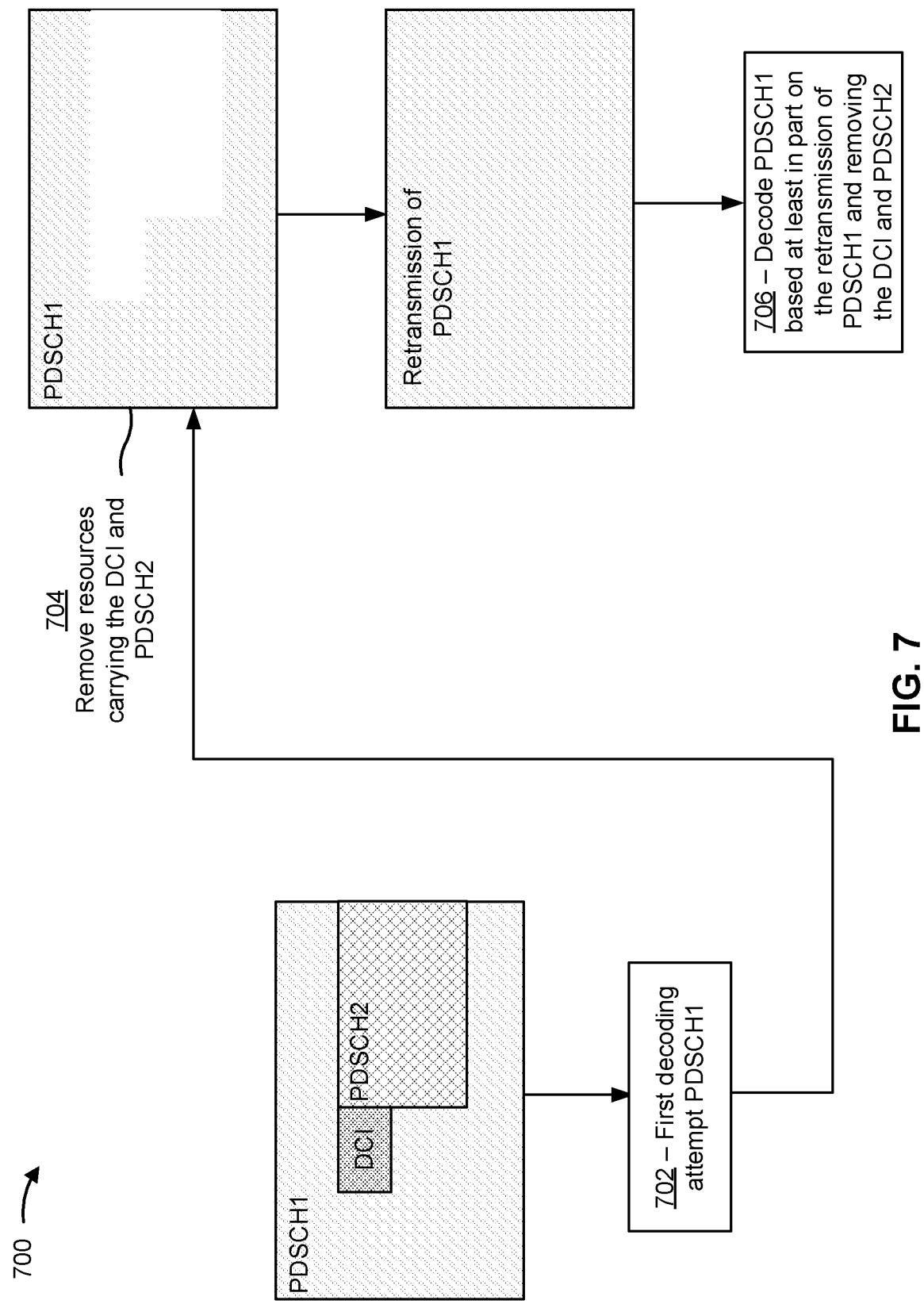

FIG. 7 is a diagram illustrating one or more examples 700 of reception of overlapping PDSCH communications, in accordance with various aspects of the present disclosure. In some aspects, example(s) 700 may include decoding a PDSCH communication (e.g., PDSCH1) that at least partially overlaps with another PDSCH communication (e.g., PDSCH2) by a UE (e.g., UE 120), and that is punctured by the other PDSCH communication and the DCI communication associated with the other PDSCH communication.

As shown in FIG. 7, and by reference number 702, the UE may perform a first decoding attempt of PDSCH1. In some aspects, the UE may perform the first decoding attempt by attempting to decode PDSCH1 without removing the resources carrying PDSCH2 and the DCI communication associated with PDSCH2. The UE may not remove overlapping resources because PDSCH1 and PDSCH2 may be processed separately, and thus the decoder for PDSCH1 may not be aware of PDSCH2 at the time when PDSCH 1 is first decoded. This may reduce the latency of PDSCH1 decoding.

As further shown in FIG. 7, and by reference number 704, the UE may remove the resources (e.g., resource elements and/or other time-domain and/or frequency-domain resources) carrying PDSCH2 and the DCI communication associated with PDSCH2 based at least in part on determining that the first decoding attempt of PDSCH1 was unsuccessful. In some aspects, the UE may identify the resources carrying PDSCH2 based at least in part on a dynamic downlink grant included in the DCI communication. In this case, the dynamic downlink grant may identify the resources that are to carry PDSCH2.

In some aspects, the UE may remove the resources carrying PDSCH2 and the DCI communication by setting the LLRs associated with the resources to zero values when de-rate matching PDSCH1. This may increase the accuracy of decoding PDSCH1, relative to using LLRs for the resources that are determined based at least in part on the resources carrying PDSCH2 and the DCI communication (e.g., relative to not setting the LLRs to zero values).

As further shown in FIG. 7, and by reference number 706, the UE may decode PDSCH1 based at least in part on removing the resources carrying PDSCH2 and the DCI communication. For example, the UE may decode PDSCH1 based at least in part on the LLRs associated with the resources being set to zero values during the de-rate matching process.

In some aspects, if a retransmission of PDSCH1 is scheduled for the UE, the UE may receive the retransmission of PDSCH1 and may further decode PDSCH1 based at least in part on the retransmission of PDSCH1. In this case, the UE may combine the first transmission of PDSCH1 (e.g., after removing the resources carrying PDSCH2 and the DCI communication) and the retransmission of PDSCH1, and may decode PDSCH1 based at least in part on the combination of the first transmission of PDSCH1 and the retransmission of PDSCH1. If the UE removes the resources carrying PDSCH2 and the DCI communication, these signals (which may not serve a purpose for decoding PDSCH1) will not contaminate the combining of PDSCH 1 and the retransmission of PDSCH1. In other words, these false signals will not impact the combining.

In some aspects, the UE may remove the resources carrying PDSCH2 and the DCI communication and may decode PDSCH1 by combining the first transmission of PSDCH1 and the retransmission of PDSCH1 based at least in part on receiving an indication from a BS to remove the resources carrying PDSCH2 and the DCI communication, and may decode PDSCH1 by combining the first transmission of PSDCH1 and the retransmission of PDSCH1. In this case, the BS may transmit the indication to the UE based at least in part on receiving a communication (e.g., a UCI communication, a MAC-CE communication, an RRC communication, and/or the like) that identifies a capability of the UE to decode punctured PDSCH communications by removing the punctured resources carrying other communications and to decode punctured PDSCH communication by combining a plurality of transmissions of the punctured PDSCH communication.

As indicated above, FIG. 7 is provided as one or more examples. Other examples may differ from what is described with respect to FIG. 7.

Figure 8:
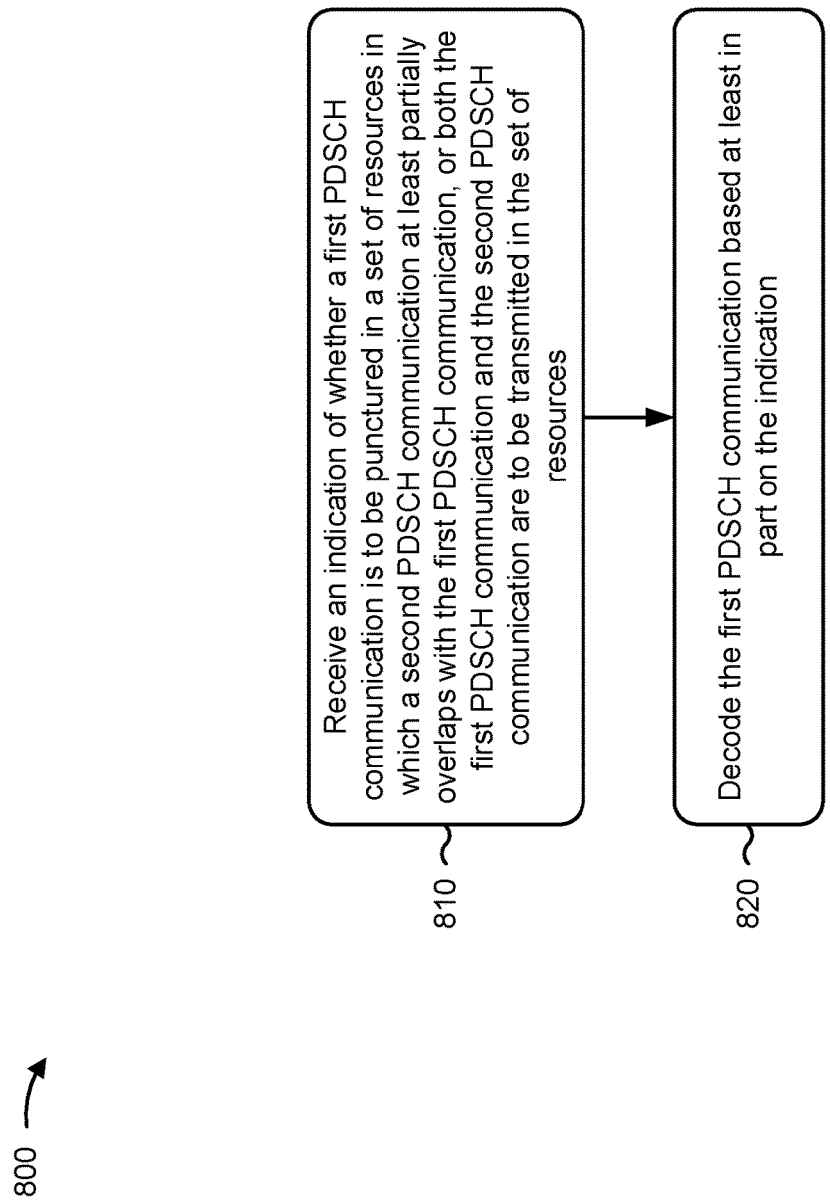
FIG. 8 is a diagram illustrating an example process performed, for example, by a UE, in accordance with various aspects of the present disclosure.

FIG. 8 is a diagram illustrating an example process 800 performed, for example, by a mobile station, in accordance with various aspects of the present disclosure. Example process 800 is an example where the mobile station (e.g., UE 120) performs operations associated with reception of overlapping PDSCH communications.

As shown in FIG. 8, in some aspects, process 800 may include receiving an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources (block 810). For example, the mobile station (e.g., using receive processor 258, transmit processor 264, controller/processor 280, memory 282, and/or the like) may receive an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources, as described above.

As further shown in FIG. 8, in some aspects, process 800 may include decoding the first PDSCH communication based at least in part on the indication (block 820). For example, the mobile station (e.g., using receive processor 258, transmit processor 264, controller/processor 280, memory 282, and/or the like) may decode the first PDSCH communication based at least in part on the indication, as described above.

Process 800 may include additional aspects, such as any single aspect or any combination of aspects described below and/or in connection with one or more other processes described elsewhere herein.

In a first aspect, the indication is included in an RRC configuration communication. In a second aspect, alone or in combination with the first aspect, the indication is included in a dynamic downlink grant that schedules the second PDSCH communication. In a third aspect, alone or in combination with one or more of the first and second aspects, the indication indicates that the first PDSCH communication is to be punctured in the set of resources in which the second PDSCH communication at least partially overlaps with the first PDSCH communication, and decoding the first PDSCH communication comprises setting LLRs associated with the set of resources to zero values and decoding the first PDSCH communication based at least in part on setting the LLRs of the set of resources to zero values.

In a fourth aspect, alone or in combination with one or more of the first through third aspects, process 800 includes transmitting a communication that identifies a capability of the mobile station to support decoding the first PDSCH communication based at least in part on setting the LLRs of the set of resources to zero values; and receiving, based at least in part on transmitting the communication, an indication to decode the first PDSCH communication based at least in part on setting the LLRs of the set of resources to zero values. In a fifth aspect, alone or in combination with one or more of the first through fourth aspects, the indication indicates that the first PDSCH communication is to be punctured in the set of resources in which the second PDSCH communication at least partially overlaps with the first PDSCH communication, and decoding the first PDSCH communication comprises attempting to decode the first PDSCH communication based at least in part on the second PDSCH communication transmitted in the set of resources.

In a sixth aspect, alone or in combination with one or more of the first through fifth aspects, process 800 includes determining that decoding the first PDSCH communication based at least in part on the second PDSCH communication transmitted in the set of resources was unsuccessful, and setting LLRs of the set of resources to zero values; receiving a retransmission of the first PDSCH communication in which the second PDSCH communication does not overlap with the retransmission of the first PDSCH communication; and decoding the first PDSCH communication based at least in part on setting the LLRs of the set of resources to zero values and the retransmission of the first PDSCH communication.

In a seventh aspect, alone or in combination with one or more of the first through sixth aspects, process 800 includes transmitting a communication that identifies a capability of the mobile station to support attempting to decode the first PDSCH communication based at least in part on the second PDSCH communication transmitted in the set of resources; and receiving, based at least in part on transmitting the communication, an indication to attempt to decode the first PDSCH communication based at least in part on the second PDSCH communication transmitted in the set of resources. In an eighth aspect, alone or in combination with one or more of the first through seventh aspects, process 800 includes transmitting one or more communications that identify at least one of a capability of the mobile station to support puncturing of the first PDSCH communication, or a capability of the mobile station to support receiving both the first PDSCH communication and the second PDSCH communication in the set of resources; and receiving the indication based at least in part on transmitting the one or more communications.

In a ninth aspect, alone or in combination with one or more of the first through eighth aspects, process 800 further comprises determining that a DCI communication associated with the second PDSCH communication at least partially overlaps with the first PDSCH communication in another set of resources, wherein decoding the first PDSCH communication comprises setting LLRs associated with the other set of resources to zero values decoding the first PDSCH communication based at least in part on setting the LLRs of the other set of resources to zero values.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
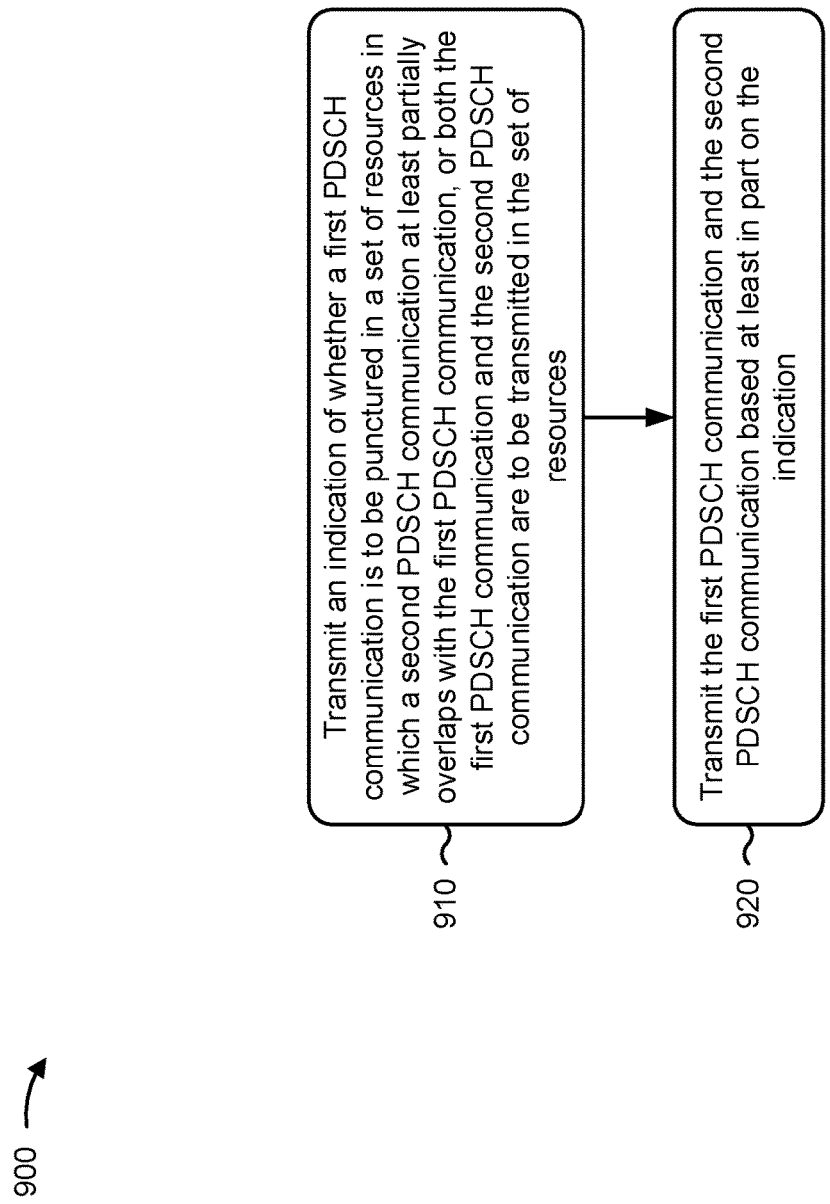
FIG. 9 is a diagram illustrating an example process performed, for example, by a BS, in accordance with various aspects of the present disclosure.

FIG. 9 is a diagram illustrating an example process 900 performed, for example, by a BS, in accordance with various aspects of the present disclosure. Example process 900 is an example where the BS (e.g., BS 110) performs operations associated with reception of overlapping PDSCH communications.

As shown in FIG. 9, in some aspects, process 900 may include transmitting an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources (block 910). For example, the BS (e.g., using transmit processor 220, receive processor 238, controller/processor 240, memory 242, and/or the like) may transmit an indication of whether a first PDSCH communication is to be punctured in a set of resources in which a second PDSCH communication at least partially overlaps with the first PDSCH communication, or both the first PDSCH communication and the second PDSCH communication are to be transmitted in the set of resources, as described above.

As further shown in FIG. 9, in some aspects, process 900 may include transmitting the first PDSCH communication and the second PDSCH communication based at least in part on the indication (block 920). For example, the BS (e.g., using transmit processor 220, receive processor 238, controller/processor 240, memory 242, and/or the like) may transmit the first PDSCH communication and the second PDSCH communication based at least in part on the indication, as described above.

Process 900 may include additional aspects, such as any single aspect or any combination of aspects described below and/or in connection with one or more other processes described elsewhere herein.

In a first aspect, the indication is included in an RRC configuration communication. In a second aspect, alone or in combination with the first aspect, the indication is included in a dynamic downlink grant associated with the second PDSCH communication. In a third aspect, alone or in combination with one or more of the first and second aspects, the indication indicates that the first PDSCH communication is to be punctured in the set of resources in which the second PDSCH communication at least partially overlaps with the first PDSCH communication, and process 900 further comprises receiving a communication that identifies a capability of a mobile station to support decoding the first PDSCH communication based at least in part on setting LLRs of the set of resources to zero values; and transmitting, based at least in part on receiving the communication, an indication to decode the first PDSCH communication based at least in part on setting the LLRs of the set of resources to zero values.

In a fourth aspect, alone or in combination with one or more of the first through third aspects, the indication indicates that the first PDSCH communication is to be punctured in the set of resources in which the second PDSCH communication at least partially overlaps with the first PDSCH communication, and process 900 further comprises receiving a communication that identifies a capability of the mobile station to support attempting to decode the first PDSCH communication based at least in part on the second PDSCH communication transmitted in the set of resources; and transmitting, based at least in part on receiving the communication, an indication to attempt to decode the first PDSCH communication based at least in part on the second PDSCH communication transmitted in the set of resources.

In a fifth aspect, alone or in combination with one or more of the first through fourth aspects, process 900 includes receiving one or more communications that identify at least one of a capability of the mobile station to support puncturing of the first PDSCH communication, or a capability of the mobile station to support receiving both the first PDSCH communication and the second PDSCH communication in the set of resources; and transmitting the indication based at least in part on receiving the one or more communications.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   receiving, by a mobile station and included in at least one of a radio resource control configuration communication or a dynamic downlink grant that schedules a second physical downlink shared channel (PDSCH) communication, an indication of whether:
      a transmission of a first PDSCH communication is to be punctured in a set of resources in which the second PDSCH communication at least partially overlaps with the first PDSCH communication, or
      both the first PDSCH communication and the second PDSCH communication are to be transmitted in the set of resources; and
   decoding, by the mobile station, the first PDSCH communication based at least in part on the indication.

2. The method of claim 1, wherein the indication indicates that the transmission of first PDSCH communication is to be punctured in the set of resources in which the second PDSCH communication at least partially overlaps with the first PDSCH communication; and
   wherein decoding the first PDSCH communication comprises:
      setting log likelihood ratios (LLRs) associated with the set of resources to zero values; and
      decoding the first PDSCH communication based at least in part on setting the LLRs of the set of resources to zero values.

3. The method of claim 2, further comprising:
   determining that a downlink control information (DCI) communication associated with the second PDSCH communication at least partially overlaps with the first PDSCH communication in another set of resources; and
   wherein decoding the first PDSCH communication comprises:
      setting LLRs associated with the other set of resources to zero values; and
      decoding the first PDSCH communication based at least in part on setting the LLRs of the other set of resources to zero values.

4. The method of claim 2, further comprising:
   transmitting a communication that identifies a capability of the mobile station to support decoding the first PDSCH communication based at least in part on setting the LLRs of the set of resources to zero values.

5. The method of claim 4, further comprising:
   receiving, based at least in part on transmitting the communication, an indication to decode the first PDSCH communication based at least in part on setting the LLRs of the set of resources to zero values.

6. The method of claim 1, wherein the indication indicates that the transmission of the first PDSCH communication is to be punctured in the set of resources in which the second PDSCH communication at least partially overlaps with the first PDSCH communication; and
   wherein decoding the first PDSCH communication comprises:
      attempting to decode the first PDSCH communication based at least in part on the second PDSCH communication transmitted in the set of resources.

7. The method of claim 6, further comprising:
   receiving a retransmission of the first PDSCH communication in which the second PDSCH communication does not overlap with the retransmission of the first PDSCH communication;
   setting log likelihood ratios (LLRs) of the set of resources to zero values based on the first PDSCH communication and second PDSCH communication at least partially overlapping in the set of resources; and
   decoding the first PDSCH communication based at least in part on setting the LLRs of the set of resources to zero values and the retransmission of the first PDSCH communication.

8. The method of claim 6, further comprising:
   transmitting a communication that identifies a capability of the mobile station to support attempting to decode the first PDSCH communication based at least in part on the second PDSCH communication transmitted in the set of resources.

9. The method of claim 8, further comprising:
   receiving, based at least in part on transmitting the communication, an indication to attempt to decode the first PDSCH communication based at least in part on the second PDSCH communication transmitted in the set of resources.

10. The method of claim 1, further comprising:
    transmitting one or more communications that identify at least one of:
       a capability of the mobile station to support puncturing of the first PDSCH communication, or
       a capability of the mobile station to support receiving both the first PDSCH communication and the second PDSCH communication in the set of resources; and
       receiving the indication based at least in part on transmitting the one or more communications.

11. A method of wireless communication, comprising:
    transmitting, by a base station (BS) and included in at least one of a radio resource control configuration communication or a dynamic downlink grant that schedules a second physical downlink shared channel (PDSCH) communication, an indication of whether:
       a transmission of a first PDSCH communication is to be punctured in a set of resources in which the second PDSCH communication at least partially overlaps with the first PDSCH communication, or both the first PDSCH communication and the second PDSCH communication are to be transmitted in the set of resources; and transmitting, by the BS, the first PDSCH communication and the second PDSCH communication based at least in part on the indication.

12. The method of claim 11, wherein the indication indicates that the transmission of the first PDSCH communication is to be punctured in the set of resources in which the second PDSCH communication at least partially overlaps with the first PDSCH communication; and wherein the method further comprises:
receiving a communication that identifies a capability of a mobile station to support decoding the first PDSCH communication based at least in part on setting log likelihood ratios (LLRs) of the set of resources to zero values.

13. The method of claim 12, further comprising:
transmitting, based at least in part on receiving the communication, an indication to decode the first PDSCH communication based at least in part on setting the LLRs of the set of resources to zero values.

14. The method of claim 11, wherein the indication indicates that the transmission of the first PDSCH communication is to be punctured in the set of resources in which the second PDSCH communication at least partially overlaps with the first PDSCH communication; and wherein the method further comprises:
receiving a communication that identifies a capability of a mobile station support attempting to decode the first PDSCH communication based at least in part on the second PDSCH communication transmitted in the set of resources.

15. The method of claim 14, further comprising:
transmitting, based at least in part on receiving the communication, an indication to attempt to decode the first PDSCH communication based at least in part on the second PDSCH communication transmitted in the set of resources.

16. The method of claim 11, further comprising:
receiving one or more communications that identify at least one of:
a capability of a mobile station to support puncturing of the first PDSCH communication, or
a capability of the mobile station to support receiving both the first PDSCH communication and the second PDSCH communication in the set of resources.

17. The method of claim 16, wherein transmitting the indication comprises:
transmitting the indication based at least in part on receiving the one or more communications.

18. A mobile station for wireless communication, comprising:
a memory; and
one or more processors coupled to the memory, the one or more processors configured to:
receive, included in at least one of a radio resource control configuration communication or a dynamic downlink grant that schedules a second physical downlink shared channel (PDSCH) communication, an indication of whether:
a transmission of a first PDSCH communication is to be punctured in a set of resources in which the second PDSCH communication at least partially overlaps with the first PDSCH communication, or
both the first PDSCH communication and the second PDSCH communication are to be transmitted in the set of resources; and
decode the first PDSCH communication based at least in part on the indication.

19. The mobile station of claim 18, wherein the indication indicates that the transmission of the first PDSCH communication is to be punctured in the set of resources in which the second PDSCH communication at least partially overlaps with the first PDSCH communication; and wherein the one or more processors, when decoding the first PDSCH communication, are configured to:
set log likelihood ratios (LLRs) associated with the set of resources to zero values; and
decode the first PDSCH communication based at least in part on setting the LLRs of the set of resources to zero values.

20. The mobile station of claim 19, wherein the one or more processors are further configured to:
determine that a downlink control information (DCI) communication associated with the second PDSCH communication at least partially overlaps with the first PDSCH communication in another set of resources; and wherein the one or more processors, when decoding the first PDSCH communication, are configured to:
set LLRs associated with the other set of resources to zero values; and
decode the first PDSCH communication based at least in part on setting the LLRs of the other set of resources to zero values.

21. The mobile station of claim 18, wherein the indication indicates that the transmission of the first PDSCH communication is to be punctured in the set of resources in which the second PDSCH communication at least partially overlaps with the first PDSCH communication; and wherein the one or more processors, when decoding the first PDSCH communication, are configured to:
attempt to decode the first PDSCH communication based at least in part on the second PDSCH communication transmitted in the set of resources.

22. The mobile station of claim 21, wherein the one or more processors are further configured to:
receive a retransmission of the first PDSCH communication in which the second PDSCH communication does not overlap with the retransmission of the first PDSCH communication;
set log likelihood ratios (LLRs) of the set of resources to zero values based on the first PDSCH communication and second PDSCH communication at least partially overlapping in the set of resources; and
decode the first PDSCH communication based at least in part on setting the LLRs of the set of resources to zero values and the retransmission of the first PDSCH communication.

23. A base station (BS) for wireless communication, comprising:
a memory; and
one or more processors coupled to the memory, the one or more processors configured to:
transmit, in at least one of a radio resource control configuration communication or a dynamic downlink grant that schedules a second physical downlink shared channel (PDSCH) communication, an indication of whether:
the transmission of a first PDSCH communication is to be punctured in a set of resources in which the second PDSCH communication at least partially overlaps with the first PDSCH communication, or both the first PDSCH communication and the second PDSCH communication are to be transmitted in the set of resources; and
transmit the first PDSCH communication and the second PDSCH communication based at least in part on the indication.

24. The BS of claim 23, wherein the indication indicates that the transmission of the first PDSCH communication is to be punctured in the set of resources in which the second PDSCH communication at least partially overlaps with the first PDSCH communication; and
wherein the one or more processors are further configured to:
receive a communication that identifies a capability of a mobile station to support decoding the first PDSCH communication based at least in part on setting log likelihood ratios (LLRs) of the set of resources to zero values.

25. The BS of claim 23, wherein the indication indicates that the transmission of the first PDSCH communication is to be punctured in the set of resources in which the second PDSCH communication at least partially overlaps with the first PDSCH communication; and
wherein the one or more processors are further configured to:
receive a communication that identifies a capability of a mobile station to support attempting to decode the first PDSCH communication based at least in part on the second PDSCH communication transmitted in the set of resources.

26. The BS of claim 23, wherein the one or more processors are further configured to:
receive one or more communications that identify at least one of:
a capability of a mobile station to support puncturing of the first PDSCH communication, or
a capability of the mobile station to support receiving both the first PDSCH communication and the second PDSCH communication in the set of resources; and
wherein the one or more processors, when transmitting the indication, are configured to:
transmit the indication based at least in part on receiving the one or more communications.

27. The BS of claim 24, wherein the one or more processors are further configured to:
transmit, based at least in part on receiving the communication, an indication to decode the first PDSCH communication based at least in part on setting the LLRs of the set of resources to zero values.

28. The BS of claim 25, wherein the one or more processors are further configured to:
transmit, based at least in part on receiving the communication, an indication to attempt to decode the first PDSCH communication based at least in part on the second PDSCH communication transmitted in the set of resources.

29. The mobile station of claim 19, wherein the one or more processors are further configured to:
transmit a communication that identifies a capability of the mobile station to support decoding the first PDSCH communication based at least in part on setting the LLRs of the set of resources to zero values.

30. The mobile station of claim 29, wherein the one or more processors are further configured to:
receive, based at least in part on transmitting the communication, an indication to decode the first PDSCH communication based at least in part on setting the LLRs of the set of resources to zero values.

* * * * *